UNITED STATES PATENT OFFICE.

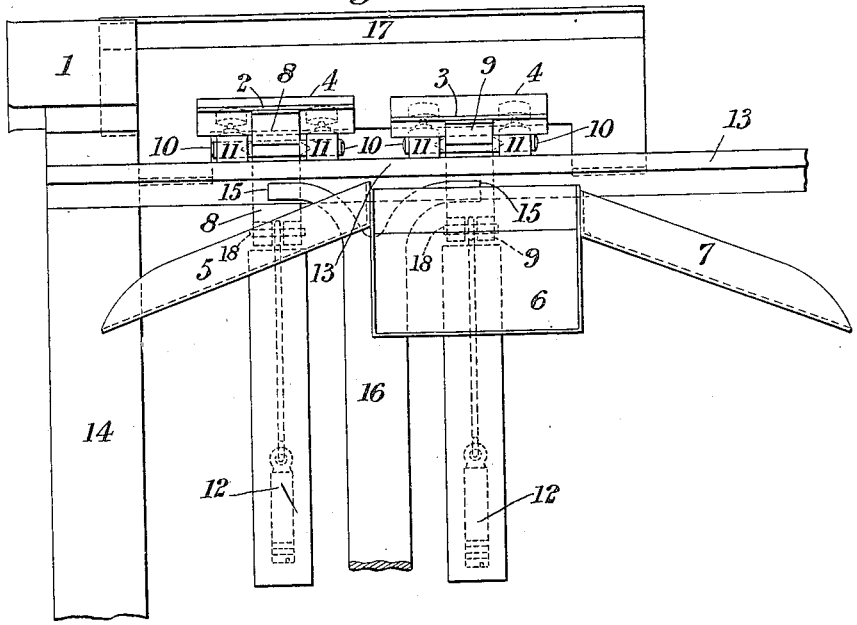
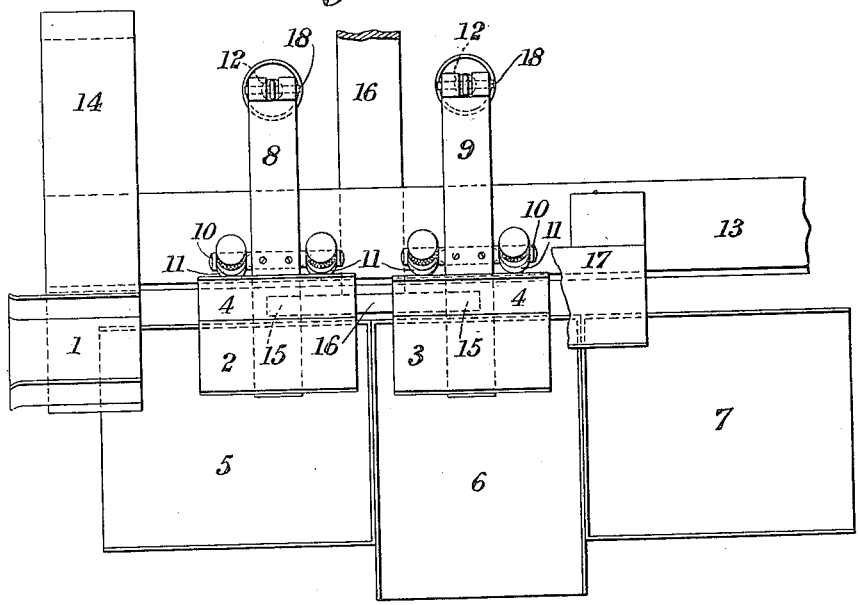

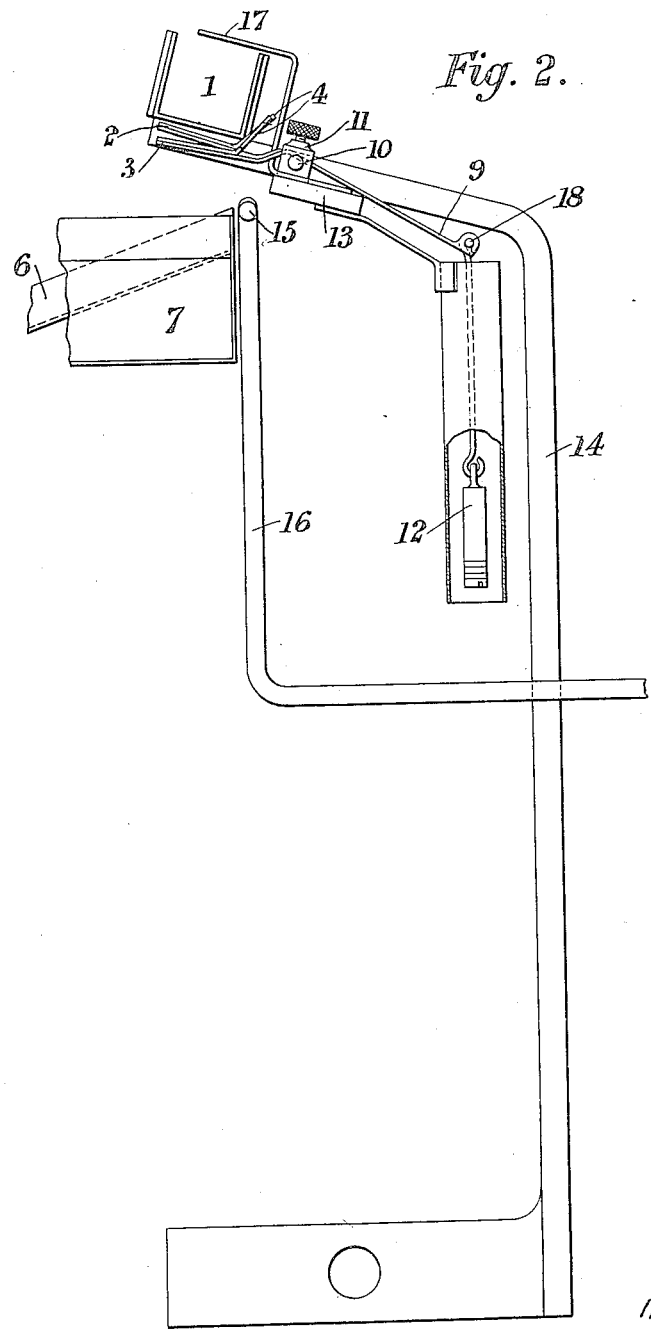

WILLIAM FAZACKERLEY, OF NEW CROSS, LONDON, ENGLAND, ASSIGNOR OF ONE-HALF TO IMPERIAL TOBACCO COMPANY (OF GREAT BRITAIN AND IRELAND) LIMITED, OF BRISTOL, ENGLAND.

WEIGHING AND SORTING APPARATUS.

1,141,048.      Specification of Letters Patent.      Patented May 25, 1915.

Application filed February 5, 1913. Serial No. 746,378.

*To all whom it may concern:*

Be it known that I, WILLIAM FAZACKERLEY, a subject of the King of Great Britain and Ireland, of 20 Bawtree road, New Cross, in the county of London, England, have invented new and useful Improvements in Weighing and Sorting Apparatus, of which the following is a specification.

This invention relates to improvements in weighing and selecting apparatus of the kind by which articles are weighed and selected in such manner that only articles of the proper weight are delivered into a receptacle, or at some other place, articles of improper weight being discarded, or delivered into other receptacles, or at other places.

Hitherto it has been proposed to construct apparatus of the character referred to provided with two counterweighted balances, onto which the articles were passed, so arranged that the first balance tilted and discharged articles of excessive weight and the second those of correct weight, while articles which were too light were carried to a third point of discharge.

The principal object of this invention is to provide an apparatus of simple construction which can be readily adapted for use with existing machines. The mechanism according to this invention is especially intended for use with packeting machines, but it is not limited to such use.

According to this invention the articles are passed onto a fixed platform and are then pushed by succeeding articles onto counterweighted platforms in line with the fixed platform. The said counterweighted platforms tilt when articles of sufficient weight are thereon and the said articles are discharged to the receptacle into, or place at, which they are to be received, but when articles of insufficient weight are delivered onto the said counterweighted platforms they do not tilt and the articles remain on the counterweighted platforms until pushed off by the succeeding articles and discharged into other receptacles, or delivered at other places.

I take, as an example in describing this invention with reference to the accompanying drawing, the case of its application to a packeting machine from which the packets are delivered to apparatus according to this invention which is designed to deliver into a receptacle, or at any required place, only packets of correct weight and to discard packets which are either too heavy, or too light, or containers which have not received their contents, but it is to be understood that if it be not required to discard packets of overweight, the device which is hereinafter described for that purpose can be dispensed with.

Figures 1 and 2 are elevations at right angles to each other and Fig. 3 is a plan of apparatus in accordance with this invention.

In line with the position which the molds of the "mold-wheel" takes up when the packets are removed therefrom is a fixed platform 1 (preferably with sides to constitute guides) onto which the packets are pushed, and in line with this platform is a tiltable platform 2 counterweighted so that it will tilt only when the packet is of overweight and in line with this is a second tiltable platform 3 counterweighted so that it will tilt when the packet is of correct weight, but not when it is too light. The said platforms 2 and 3 may be provided with a guiding side 4 to retain the articles in proper position and there may be a fixed guard at the rear of the platforms as shown at 17. The packets which are on the platforms are propelled by succeeding packets discharged from the packeting machine. When a packet is received on the first tiltable platform 2, if the said packet be of overweight, the said platform will tilt and the packet will be discharged by the chute 5 into a receptacle, or at a place, destined for overweight packets. If the packet be not of overweight, it will remain on the platform 2 which will keep in its untilted position so that when another packet is discharged from the machine, the packet on the said platform 2 will be pushed onto the second tiltable platform 3, and, if this packet be of correct weight, it will cause the platform to tilt and the packet will be discharged by the chute 6 into a receptacle, or at the required place, say onto a carrier, to be conducted to the place destined to receive packets of correct weight, while if the packet be of underweight, or if an unfilled container has been received, the platform will not tilt and succeeding packets will cause it to be pushed from the said platform and delivered by the chute 7 to a receptacle, or at a place destined for packets which are too light, or for unfilled containers.

If the packets be round, the tiltable platforms should be shaped so that the packets will be retained thereby until the said platforms are tilted.

The tiltable platforms can be mounted to tilt in any suitable way and be provided with any suitable means to allow them to tilt under any predetermined weights. The arrangements illustrated for these purposes are as follows:—The platforms 2 and 3 are each carried on a lever (marked 8 and 9 respectively) turning on pins 10 carried by standards 11 on a cross-piece 13 supported by bracket standards as at 14 and these may be mounted so as to be adjustable if desired. The counterbalance weights 12 are suspended from pins 18 at the ends of the levers 8 and 9 so that the said weights will always keep in a vertical position. They are shown as being guarded by tubes supported from the cross-piece 13. Means may be provided (especially with machines operating at high speeds) to insure the tiltable platforms being returned to position after tilting in time to receive the succeeding packet, which may be done for example by means of arms 15 on an arm 16 operated by any suitable means such for instance as the shaft which operates the mechanism for feeding the material to be packeted.

The receiving platform 1 as well as the tilting platforms 2 and 3 are all preferably normally inclined to the horizontal in order that the packages may tend to slide down against the retaining sides 4 and thus follow one another in substantially precise alinement as they pass through the apparatus. This is of course essential since the advance of each package is attained through the engagement therewith of the one which follows. At the same time the first tilting platform (2) is normally slightly below the plane of the receiving platform so that the package passes thereto without danger of striking the edge of the platform. Similarly the second tilting platform 3 is slightly below the level of the platform 2 for the same reason. Thus (3) is normally at a slightly less incline to the horizontal than (2) so that in case the latter is slightly depressed by the packet, (but not sufficiently to discharge) it (2) will swing down on the pivot 10 into register with the incline of platform 3 and thus the packet will pass to the latter without obstruction. For the same reason viz. to insure unobstructed delivery from one platform to the other, the guard walls 4 are inclined to a greater degree (viz. at an obtuse angle) to the weighing platform than the guard wall at the lower margin of the stationary receiving platform is to the latter, the angle in the latter case being one of substantially ninety degrees.

If it be not desired to discard articles which are too heavy, the platform 2 and its adjuncts can be dispensed with when the platform 3 will tilt and discharge articles of correct weight and above and articles which are too light and empty containers will be pushed therefrom by succeeding articles.

What I claim is:

1. In apparatus of the character described, a fixed receiving platform inclined to the horizontal and having a guard wall at its lower margin, said platform being open at each end and unobstructed so as to afford a straight-through channel for packets intermittently delivered thereto one behind the other, and in contact, in combination with a tiltable weighing platform arranged in advance thereof and slightly below said receiving platform to receive a packet from the latter, said weighing platform being also normally inclined to the horizontal at approximately the angle of the receiving platform, and having at its lower edge a guard wall to prevent the escape of the packet.

2. In apparatus of the character described, a fixed receiving platform inclined to the horizontal and having a guard wall at its lower margin, said platform being open at each end and unobstructed so as to afford a straight-through channel for packets intermittently delivered thereto one behind the other, and in contact, in combination with a tiltable weighing platform arranged in advance thereof and slightly below said receiving platform to receive a packet from the latter, said weighing platform being also normally inclined to the horizontal at approximately the angle of the receiving platform, and having at its lower edge a guard wall to prevent the escape of the packet, the angle between the guard wall and the weighing platform being greater than that between the platform and guard wall of the receiving table to insure the unobstructed delivery of the packet from the latter to weighing platform.

3. In apparatus of the character described, a fixed receiving platform inclined to the horizontal and having a guard wall at its lower margin, said platform being open at each end and unobstructed so as to afford a straight-through channel for packets intermittently delivered thereto one behind the other, and in contact, in combination with a tiltable weighing platform arranged in advance thereof and slightly below said receiving platform to receive a packet from the latter, said weighing platform being also normally inclined to the horizontal at approximately the angle of the receiving platform, and having at its lower edge a guard wall to prevent the escape of the packet, together with a second tiltable weighing platform arranged in advance of said first weighing platform and normally inclined to the horizontal to a slightly less degree than the latter, for the purpose described.

4. In apparatus of the character described, a fixed receiving platform inclined to the horizontal and affording a straight-through channel for packets intermittently delivered thereto, in combination with a tiltable weighing platform normally inclined to the horizontal in substantially the same plane as the receiving table but slightly below the latter to insure the unobstructed discharge of packets therefrom to the weighing platform.

In testimony whereof I have signed my name to this specification in the presence of two subscribing witnesses.

WILLIAM FAZACKERLEY.

Witnesses:
WILLIAM THOMAS JAMES,
GILBERT FLETCHER TYSON.

Copies of this patent may be obtained for five cents each, by addressing the "Commissioner of Patents, Washington, D. C."